United States Patent
Yu et al.

(10) Patent No.: US 12,012,331 B2
(45) Date of Patent: Jun. 18, 2024

(54) PREPARATION METHOD OF POROUS SODIUM IRON PHOSPHATE USED AS SODIUM ION BATTERY CATHODE MATERIAL

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yinghao Xie, Foshan (CN); Aixia Li, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/260,033

(22) PCT Filed: Aug. 25, 2022

(86) PCT No.: PCT/CN2022/114920
§ 371 (c)(1),
(2) Date: Jun. 29, 2023

(87) PCT Pub. No.: WO2023/093158
PCT Pub. Date: Jun. 1, 2023

(65) Prior Publication Data
US 2024/0067525 A1  Feb. 29, 2024

(30) Foreign Application Priority Data

Nov. 26, 2021 (CN) .......................... 202111421179.4

(51) Int. Cl.
*C01B 25/45* (2006.01)
*H01M 4/1397* (2010.01)
*H01M 4/58* (2010.01)

(52) U.S. Cl.
CPC .......... *C01B 25/45* (2013.01); *H01M 4/1397* (2013.01); *H01M 4/5825* (2013.01); *C01P 2004/03* (2013.01); *C01P 2006/40* (2013.01)

(58) Field of Classification Search
CPC ............ H01M 4/1397; H01M 4/5825; H01M 2004/028
See application file for complete search history.

(56) References Cited

FOREIGN PATENT DOCUMENTS

| CN | 1821063 A | | 8/2006 |
|---|---|---|---|
| CN | 104752717 | * | 7/2015 |

(Continued)

OTHER PUBLICATIONS

English translation of CN Publication 106629648, May 2017.*

(Continued)

*Primary Examiner* — Brittany L Raymond
(74) *Attorney, Agent, or Firm* — Buchalter; Jason W. Croft

(57) ABSTRACT

Disclosed is a preparation method of porous sodium iron phosphate used as a sodium ion battery cathode material, which includes: mixing ferrous nitrate, silver nitrate and a reducing agent to prepare a mixed solution, adding the mixed solution dropwise to a carbonate solution for reaction to obtain a precipitate, mixing the precipitate with sodium dihydrogen phosphate and sodium iodide and then grinding, sintering the ground material under the condition of air (Continued)

isolation, and soaking the sintered material in an organic solvent to obtain porous sodium iron phosphate used as a sodium ion battery cathode material.

10 Claims, 1 Drawing Sheet

(56) References Cited

FOREIGN PATENT DOCUMENTS

| | | | |
|---|---|---|---|
| CN | 104752717 A | | 7/2015 |
| CN | 106629648 | * | 5/2017 |
| CN | 106629648 A | | 5/2017 |
| CN | 108039491 | * | 5/2018 |
| CN | 108039491 A | | 5/2018 |
| CN | 110957490 A | | 4/2020 |
| CN | 111056544 A | | 4/2020 |
| CN | 113526483 A | | 10/2021 |
| CN | 114249311 A | | 3/2022 |
| CN | 114249311 B | | 3/2023 |
| JP | 6101771 B1 | | 3/2017 |

OTHER PUBLICATIONS

English translation of CN Publication 104752717, Jul. 2015.*
English translation of CN Publication 108039491, May 2018.*
Notification to Grant Patent Right for Invention in Chinese Application 2021114211794 issued Jan. 4, 2023.
International Search Report in PCT/CN2022/114920 mailed Nov. 9, 2022.
Written Opinion in PCT/CN2022/114920 mailed Nov. 9, 2022.
First Search in Chinese Patent Application No. 2021114211794 mailed Dec. 2, 2022.

* cited by examiner

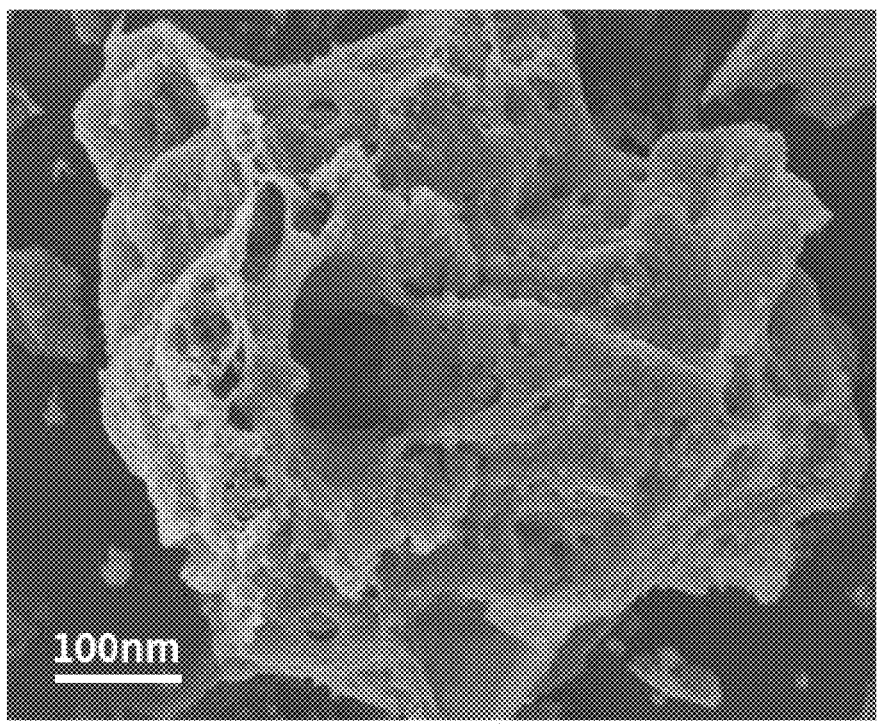

PREPARATION METHOD OF POROUS SODIUM IRON PHOSPHATE USED AS SODIUM ION BATTERY CATHODE MATERIAL

CROSS-REFERENCE TO RELATED APPLICATION

This application is a national stage filing under 35 U.S.C. § 371 of international application number PCT/CN2022/114920, filed Aug. 25, 2022, which claims priority to Chinese patent application No. 202111421179.4 filed Nov. 26, 2021. The contents of these applications are incorporated herein by reference in their entirety.

TECHNICAL FIELD

The present disclosure belongs to the technical field of sodium ion batteries, and specifically relates to a preparation method of porous sodium iron phosphate used as a sodium ion battery cathode material.

BACKGROUND

In recent years, electrochemical energy has gradually begun to be used as power energy devices around the world. Lithium-ion batteries have gradually attracted the attention of scientific researchers due to their advantages such as no memory effect, high voltage platform, high specific energy, environmental friendliness, low self-discharge, safety and stability and low specific gravity, and have become a star object in chemical power sources. With the rapid growth of demand for lithium-ion batteries in various application fields and the rapid increase in people's expectations for the use of various electrical appliances and equipment, in-depth research and development of lithium-ion battery materials are of great significance to the development of human society and the improvement of people's living standards.

Sodium, which is in the same main group as lithium, is the second lightest metal element, and has a fairly high abundance in the earth's crust, reaching 2.3%-2.8%. In addition, the half-cell potential of sodium-ion batteries is only 0.3 V higher than that of lithium-ion batteries. At the same time, sodium and lithium have similar electrochemical properties, so sodium ions can be used instead of lithium ions. As the price of lithium resources soars day by day and the resources become increasingly scarce, the research and development of sodium storage technology and industrial production will have great commercial value.

The development of sodium-ion batteries can alleviate the shortage of lithium resources to a certain extent, and has a greater competitive advantage in the market. Therefore, the research and development of electrode materials for sodium ion batteries has gradually become a hot topic in energy storage research. The currently reported sodium storage cathode materials mainly include polyanionic compounds, Prussian blue sodium salts and transition metal oxides.

Polyanionic compounds mainly include transition metal (pyro) phosphates, fluorophosphates, etc., where polyanionic phosphate materials may become the best cathode materials for sodium ion batteries due to their stable structure and higher working voltage. Iron-based phosphate materials have great development prospects as battery cathode materials due to their good safety and low cost. However, due to the low conductivity and the low ion diffusion rate of this kind of materials, the industrial application of the materials is limited.

In order to solve the above-mentioned problems, when iron-based phosphate sodium ion battery cathode materials are prepared, the phosphorus source, iron source, sodium source and carbon source are commonly used for sintering with the pyrolysis effect of the carbon source, on the one hand, iron is reduced to divalent, on the other hand, coke is produced due to carbonizing, the conductivity of the materials is improved, it can kill two birds with one stone, so that method is the most commonly used technical means in the existing technology. However, when the carbon source is pyrolyzed, gases such as carbon monoxide and hydrogen are generated, then ferric ions can be reduced to iron element at 500° C.-700° C., and magnetic foreign bodies are produced; and in addition, a small amount of impurities such as FeP, $Fe_2P$ and $Fe_2P_2O_7$ are produced. Due to these impurities, the specific capacity and energy density of the materials are reduced, and impurity iron will also dissolve in an electrolyte and cause side reactions, thereby affecting the service life and safety performance of batteries.

SUMMARY

The present disclosure aims to solve at least one of the technical problems existing in the above-mentioned existing technology. For this reason, the present disclosure provides a preparation method of porous sodium ferric phosphate used as a sodium ion battery cathode material.

According to one aspect of the present disclosure, a preparation method of porous sodium ferric phosphate used as a sodium ion battery cathode material is provided and includes the following steps:

S1: ferrous nitrate, silver nitrate and a reducing agent are mixed into a mixed solution;

S2: the mixed solution is added dropwise to a carbonate solution for reaction under the condition of oxygen isolation, and the solid-liquid separation is carried out to obtain a precipitate;

S3: the precipitate is mixed with sodium dihydrogen phosphate and sodium iodide and then ground to obtain a ground material; and S4: the ground material is sintered under the condition of air isolation to obtain the sintered material, the sintered material is soaked in an organic solvent, the solid-liquid separation is carried out, and the porous sodium iron phosphate used as the sodium ion battery cathode material is obtained.

In some embodiments of the present disclosure, in step S1, the concentration of the ferrous nitrate in the mixed solution is 0.1-2.0 mol/L, and the molar ratio of the ferrous nitrate to the silver nitrate is 100: (0.8-4).

In some embodiments of the present disclosure, in step S1, the reducing agent is one or more of butylhydroxyanisole, dibutylhydroxytoluene, propyl gallate, tert-butyl hydroquinone or ascorbic acid; and the concentration of the reducing agent in the mixed solution is 0.001-0.25 mol/L.

In some embodiments of the present disclosure, in step S2, the carbonate solution is at least one of a sodium carbonate solution, a potassium carbonate solution or an ammonium carbonate solution; and the concentration of carbonate ions in the carbonate solution is 0.1-1.0 mol/L.

In some embodiments of the present disclosure, in step S2, during the dropping process, the concentration of carbonate ions in the reaction solution is controlled to be always higher than or equal to 0.01 mol/L.

In some embodiments of the present disclosure, in step S3, the molar ratio of Fe, P to I elements in the ground material is (1.01-1.2):1:(0.01-0.2).

In some embodiments of the present disclosure, in step S3, the grinding is carried out for 1-2 h.

In some embodiments of the present disclosure, in step S4, the sintering is carried out at a temperature of 550-800° C., and a heating rate of 2-5° C./min.

In some embodiments of the present disclosure, in step S4, the sintering is carried out for 8-12 h.

In some embodiments of the present disclosure, in step S4, the organic solvent is at least one of anhydrous methanol, anhydrous ethanol or acetone.

In some embodiments of the present disclosure, in step S4, the soaking is carried out for 0.5-1 h.

According to a preferred embodiment of the present disclosure, the present disclosure has at least the following beneficial effects:
1. According to the present disclosure, a mixture of silver carbonate and ferrous carbonate is prepared by a co-precipitation method at first to obtain a co-crystal doped at the atomic level of silver and iron, and then the co-crystal is co-sintered with sodium dihydrogen phosphate and sodium iodide to prepare sodium iron phosphate. The sodium dihydrogen phosphate provides a source of phosphorus and sodium, and when sodium dihydrogen phosphate and ferrous carbonate are subjected to solid phase mixing and sintering, the silver carbonate is gradually decomposed into carbon dioxide and silver oxide, the silver oxide is decomposed into silver element and oxygen, silver element is excellent in electrical conductivity, which can increase the conductivity of the material, and silver element is an inert metal and does not pose a safety hazard to a battery like other magnetic foreign impurities.
2. During the sintering process, sodium iodide plays a reducing role to prevent ferrous iron from being oxidized to trivalent iron, the reducibility of sodium iodide is limited and will not reduce ferrous iron to elemental iron, resulting in generation of magnetic foreign bodies, nor will it deprive oxygen from phosphate to produce phosphide impurities; and the sodium iodide is oxidized to generate iodine elemental substance, which is sublimated into iodine vapor and separated from the material during sintering. Meanwhile, after the sintering reaction is completed, by soaking in an organic solvent, due to the easy solubility of sodium iodide in organic solvents, excess sodium iodide and residual iodine are removed, therefore a metal silver element modified porous sodium iron phosphate used as a sodium ion battery cathode material is obtained.
3. When the material is sintered and prepared, as the reaction progresses, gas overflows and the material becomes a porous structure, when used as a negative electrode material, this structure is more conducive to the infiltration of the electrolyte and the deintercalation of sodium ions, thereby improving the rate performance.

BRIEF DESCRIPTION OF DRAWINGS

The present disclosure will be further explained below with reference to the accompanying drawings and embodiments, where:

FIG. 1 is an SEM image of porous sodium iron phosphate used as a sodium ion battery cathode material prepared in Embodiment 1 of the present disclosure.

DETAILED DESCRIPTION

The concept of the present disclosure and the technical effects achieved by it will be described clearly and completely in conjunction with the embodiments below, so the purpose, features and effects of the present disclosure can be fully understood. Apparently, the described embodiments are only a part of the embodiments of the present disclosure, rather than all the embodiments. Based on the embodiments of the present disclosure, other embodiments obtained by those skilled in the art without creative work shall fall within the protection scope of the present disclosure.

Embodiment 1

In this embodiment, porous sodium iron phosphate used as a sodium ion battery cathode material was prepared. The specific process was as follows:
(1) a mixed solution of ferrous nitrate, silver nitrate and a reducing agent was prepared, where the concentration of ferrous nitrate was 2.0 mol/L, the concentration ratio of ferrous nitrate to silver nitrate was 100:4, and the reducing agent was ascorbic acid with a concentration of 0.25 mol/L;
(2) a sodium carbonate solution with a concentration of 0.2 mol/L was prepared;
(3) the mixed solution was added to the sodium carbonate solution dropwise for reaction under the condition of oxygen isolation while it was ensured that the carbonate ion concentration in the reaction solution was always higher than or equal to 0.01 mol/L;
(4) after the reaction, the solid-liquid separation was carried out, precipitate, sodium dihydrogen phosphate and sodium iodide were mixed uniformly according to the molar ratio of Fe, P to I elements at 1.01:1:0.1, and then ground for two hours, and a ground material was obtained;
(5) the ground material was heated to 550° C. at a heating rate of 2° C./min under the condition of air isolation and held at 550° C. for 12 hours; and
(6) the sintered material was added to absolute ethanol and soaked for 0.5 h, the solid-liquid separation was carried out after soaking, a solid material was dried, and thus the porous sodium iron phosphate used as the sodium ion battery cathode material was obtained.

Embodiment 2

In this embodiment, porous sodium iron phosphate used as a sodium ion battery cathode material was prepared. The specific process was as follows:
(1) a mixed solution of ferrous nitrate, silver nitrate and a reducing agent was prepared, where the concentration of ferrous nitrate was 1.0 mol/L, the concentration ratio of ferrous nitrate to silver nitrate was 100:2, and the reducing agent was butyl hydroxyanisole with a concentration of 0.1 mol/L;
(2) a potassium carbonate solution with a concentration of 0.5 mol/L was prepared;
(3) the mixed solution was added to the potassium carbonate solution dropwise for reaction under the condition of oxygen isolation while it was ensured that the carbonate ion concentration in the reaction solution was always higher than or equal to 0.01 mol/L;
(4) after the reaction, the solid-liquid separation was carried out, precipitate, sodium dihydrogen phosphate and sodium iodide were mixed uniformly according to the molar ratio of Fe, P to I elements at 1.1:1:0.15, and then ground for an hour, and a ground material was obtained;

(5) the ground material was heated to 670° C. at a heating rate of 3° C./min under the condition of air isolation and held at 670° C. for 10 hours; and
(6) the sintered material was added to acetone and soaked for an hour, the solid-liquid separation was carried out after soaking, a solid material was dried, and thus the porous sodium iron phosphate used as the sodium ion battery cathode material was obtained.

Embodiment 3

In this embodiment, porous sodium iron phosphate used as a sodium ion battery cathode material was prepared. The specific process was as follows:
(1) a mixed solution of ferrous nitrate, silver nitrate and a reducing agent was prepared, where the concentration of ferrous nitrate was 0.1 mol/L, the concentration ratio of ferrous nitrate to silver nitrate was 100:0.8, the reducing agent was tert-butyl hydroquinone with a concentration of 0.001 mol/L;
(2) a ammonium carbonate solution with a concentration of 1.0 mol/L was prepared;
(3) the mixed solution was added to the ammonium carbonate solution dropwise for reaction under the condition of oxygen isolation while it was ensured that the carbonate ion concentration in the reaction solution was always higher than or equal to 0.01 mol/L;
(4) after the reaction, the solid-liquid separation was carried out, precipitate, sodium dihydrogen phosphate and sodium iodide were mixed uniformly according to the molar ratio of Fe, P to I elements at 1.08:1:0.08, and then ground for 1.5 hours, and a ground material was obtained;
(5) the ground material was heated to 800° C. at a heating rate of 5° C./min under the condition of air isolation and held at 800° C. for 8 hours; and
(6) the sintered material was added to absolute methanol and soaked for 0.5 h, the solid-liquid separation was carried out after soaking, a solid material was dried, and thus the porous sodium iron phosphate used as the sodium ion battery cathode material was obtained.

Comparative Example

In this comparative example, a carbon-coated $NaFePO_4$ material was prepared. The specific process was as follows:
0.1 mol of $Fe(NO_3)_3$, 0.1 mol of $NaH_2PO_4$, 5.0 g of glucose and 12.5 g of citric acid were added into a beaker, 76 mL of ethylene glycol was added as a dispersant, the materials were stirred at a stirring speed of 200 r/min for 8 h at a water bath temperature of 70° C. to form a gel, then the gel was baked in an oven at 90° C. for 24 h, the material was taken out and ground, the material was calcined in argon at 600° C. for 8 h after grinding, and a carbon-coated $NaFePO_4$ material was obtained.

Experiment

In this experiment, the cathode material for sodium ion batteries prepared in Embodiment 1-3 and the carbon-coated $NaFePO_4$ material obtained in the comparative example are adopted to prepare cathode plates for sodium ion batteries, a metal sodium plates are used as battery anodes, 1 mol/L of $NaPF_6$ electrolyte is used as an electrolyte, and all the materials are assembled into CR2032 button batteries; and the rate performance of the assembled button batteries is tested at 25° C., the rate is set according to 1 C=155 mA/g, and the results are shown in Table 1.

TABLE 1

| | 0.1 C discharge gram capacity mAh/g | 0.2 C discharge gram capacity mAh/g | Magnetic foreign body content |
|---|---|---|---|
| Embodiment 1 | 151 | 93 | 2 |
| Embodiment 2 | 146 | 88 | 3 |
| Embodiment 3 | 147 | 86 | 2 |
| Comparative example | 143 | 80 | 18 |

It can be seen from Table 1 that the discharge gram capacity of the embodiments at a rate of 0.2 C is significantly higher than that of the comparative example, and the content of magnetic foreign bodies is much lower than that of the comparative example. The reason is that the carbon source of the comparative example generates gases such as carbon monoxide and hydrogen gas during pyrolysis, which can reduce ferric iron ions into iron element during calcination, magnetic foreign bodies are produced, and a small amount of impurities are also produced. These impurities reduce the specific capacity of the material. The porous structure of the embodiments can also improve the performance of the material.

The embodiments of the present disclosure are described in detail above with reference to the accompanying drawings, but the present disclosure is not limited to the above embodiments, and within the scope of knowledge possessed by a person of ordinary skill in the art, various changes can be made without departing from the purpose of the present disclosure. Furthermore, the embodiments of the present disclosure and the features in the embodiments can be combined with each other if there is no conflict.

The invention claimed is:

1. A preparation method of porous sodium iron phosphate used as a sodium ion battery cathode material, comprising the following steps:
   S1: mixing ferrous nitrate, silver nitrate and a reducing agent into a mixed solution;
   S2: dropwise adding the mixed solution to a carbonate solution for reaction under the condition of oxygen isolation, and performing solid-liquid separation on a resulting reaction product to obtain a precipitate;
   S3: mixing the precipitate with sodium dihydrogen phosphate and sodium iodide, and then grinding a resulting mixture to obtain a ground material; and
   S4: sintering the ground material under the condition of air isolation to obtain a sintered material, soaking the sintered material in an organic solvent, and performing solid-liquid separation on the organic solvent soaking with the sintered material to obtain the porous sodium iron phosphate used as the sodium ion battery cathode material.

2. The preparation method of claim 1, wherein in step S1, the concentration of the ferrous nitrate in the mixed solution is 0.1 mol/L to 2.0 mol/L, and the molar ratio of the ferrous nitrate to the silver nitrate is 100:(0.8 to 4).

3. The preparation method of claim 1, wherein in step S1, the reducing agent is one or more of butylhydroxyanisole, dibutylhydroxytoluene, propyl gallate, tert-butyl hydroquinone or ascorbic acid.

4. The preparation method of claim 1, wherein in step S2, the carbonate solution is at least one of a sodium carbonate solution, a potassium carbonate solution or an ammonium carbonate solution.

5. The preparation method of claim 1, wherein in step S2, during the dropwise adding, the concentration of carbonate ions in a reaction solution is controlled to be always higher than or equal to 0.01 mol/L.

6. The preparation method of claim 1, wherein in step S3, the molar ratio of Fe to P to I elements in the ground material is (1.01-1.2):1:(0.01-0.2).

7. The preparation method of claim 1, wherein in step S3, the grinding is carried out for 1 hour to 2 hours.

8. The preparation method of claim 1, wherein in step S4, the sintering is carried out at a temperature of 550° C.-800° C.

9. The preparation method of claim 1, wherein in step S4, the organic solvent is at least one of anhydrous methanol, anhydrous ethanol or acetone.

10. The preparation method of claim 1, wherein in step S4, the soaking is carried out for 0.5 hours to 1 hour.

* * * * *